United States Patent [19]
Robinson, III

[11] Patent Number: 5,838,229
[45] Date of Patent: Nov. 17, 1998

[54] REMOTE TIRE PRESSURE MONITORING SYSTEM EMPLOYING CODED TIRE IDENTIFICATION AND RADIO FREQUENCY TRANSMISSION AND ENABLING RECALIBRATION UPON TIRE ROTATION OR REPLACEMENT

[75] Inventor: Jerry H. Robinson, III, Matthews, N.C.

[73] Assignee: Schrader-Bridgeport International, Inc., Chicago, Ill.

[21] Appl. No.: 791,389

[22] Filed: Jan. 30, 1997

Related U.S. Application Data

[63] Continuation of Ser. No. 491,890, filed as PCT/US93/01995 Mar. 11, 1993, Pat. No. 5,600,301.

[51] Int. Cl.⁶ .................................................. B60C 23/00
[52] U.S. Cl. ......................... 340/442; 340/445; 340/447; 73/146.5; 73/146.8
[58] Field of Search .................................... 340/442, 447, 340/539, 445; 73/146.5, 146.8, 146.4; 200/61.22, 61.25

[56] References Cited

U.S. PATENT DOCUMENTS

| | | | |
|---|---|---|---|
| 3,806,639 | 4/1974 | Evans .................................. | 340/870.18 |
| 3,958,558 | 5/1976 | Dunphy et al. ...................... | 128/653.1 |
| 4,048,614 | 9/1977 | Shumway ............................. | 340/447 |
| 4,071,724 | 1/1978 | Lejeune ............................... | 200/61.25 |
| 4,127,110 | 11/1978 | Bullara ................................ | 128/748 |
| 4,174,617 | 11/1979 | Jalaki-Karchay ..................... | 60/602 |
| 4,181,831 | 1/1980 | Mayer et al. ........................ | 200/61.25 |
| 4,237,728 | 12/1980 | Betts et al. .......................... | 73/146.5 |
| 4,240,061 | 12/1980 | Cohen ................................. | 340/442 |
| 4,254,312 | 3/1981 | Migrin ................................. | 200/61.25 |
| 4,263,579 | 4/1981 | Corgan et al. ....................... | 340/447 |
| 4,267,546 | 5/1981 | Matsuda et al. ..................... | 340/448 |
| 4,275,377 | 6/1981 | Matsuda et al. ..................... | 340/448 |
| 4,311,985 | 1/1982 | Gee et al. ............................ | 340/447 |
| 4,319,220 | 3/1982 | Pappas et al. ....................... | 340/447 |
| 4,337,652 | 7/1982 | Matsuda et al. ..................... | 73/146.5 |
| 4,348,654 | 9/1982 | Matsuda et al. ..................... | 340/448 |
| 4,350,854 | 9/1982 | Matsuda et al. ..................... | 200/61.25 |
| 4,384,482 | 5/1983 | Snyder ................................ | 73/146.5 |
| 4,468,650 | 8/1984 | Barbee ................................ | 340/447 |
| 4,494,106 | 1/1985 | Smith et al. ......................... | 340/442 |
| 4,510,484 | 4/1985 | Snyder ................................ | 340/447 |
| 4,554,527 | 11/1985 | Muller ................................. | 340/443 |
| 4,567,459 | 1/1986 | Folger et al. ........................ | 73/146.5 |
| 4,581,925 | 4/1986 | Crutcher ............................. | 73/146.8 |
| 4,644,317 | 2/1987 | Aingworth .......................... | 340/447 |
| 4,694,273 | 9/1987 | Franchino ........................... | 340/447 |
| 4,695,823 | 9/1987 | Vernon ................................ | 340/447 |
| 4,703,650 | 11/1987 | Dosjoub et al. ..................... | 73/146.5 |
| 4,734,674 | 3/1988 | Thomas et al. ..................... | 340/447 |

(List continued on next page.)

FOREIGN PATENT DOCUMENTS

| | | |
|---|---|---|
| 0 671 289 A1 | 9/1995 | European Pat. Off. . |
| 2 671 650 | 7/1992 | France . |
| 3-14099 | 1/1991 | Japan . |
| WO 92/14620 | 9/1992 | WIPO . |
| WO 93/02875 | 2/1993 | WIPO . |

*Primary Examiner*—Edward Lefkowitz
*Assistant Examiner*—Van T. Trieu
*Attorney, Agent, or Firm*—Sughrue, Mion, Zinn, Macpeak & Seas, PLLC

[57] ABSTRACT

A system for indicating low tire pressure in vehicles, in which each vehicle wheel has a transmitter (100) with a unique code. A central receiver (200) in the vehicle is taught, at manufacture, to recognize the codes for the respective transmitters (100) for the vehicle, and also a common transmitter code, in the event one of the transmitters (102) needs to be replaced. During vehicle operation and maintenance, when the tires are rotated, the system can be recalibrated to relearn the locations of the transmitters. The transmitters (100) employ surface acoustic wave (SAW) devices (110). An application specific integrated circuit (ASIC) encoder (130) in each transmitter (100) is programmed at manufacture, in accordance with its unique code, to send its information at different intervals, to avoid clash between two or more transmitters (100) on the vehicle. The transmitters (100) are powered by long-life batteries.

53 Claims, 6 Drawing Sheets

U.S. PATENT DOCUMENTS

| | | | |
|---|---|---|---|
| 4,737,761 | 4/1988 | Dosjoub et al. | 340/448 |
| 4,761,996 | 8/1988 | Schmid et al. | 73/146.5 |
| 4,783,993 | 11/1988 | Lothar et al. | 73/146.5 |
| 4,816,802 | 3/1989 | Doerksen et al. | 340/447 |
| 4,823,107 | 4/1989 | Pompier | 340/442 |
| 4,954,677 | 9/1990 | Alberter et al. | 200/834 |
| 4,966,034 | 10/1990 | Bock et al. | 73/146.5 |
| 4,970,491 | 11/1990 | Saint et al. | 340/447 |
| 4,978,941 | 12/1990 | Brown | 340/447 |
| 5,001,457 | 3/1991 | Wang | 340/447 |
| 5,054,315 | 10/1991 | Dosjoub | 73/146.5 |
| 5,061,917 | 10/1991 | Higgs et al. | 340/447 |
| 5,083,457 | 1/1992 | Schultz | 73/146.5 |
| 5,109,213 | 4/1992 | Williams | 346/447 |
| 5,140,851 | 8/1992 | Hettich et al. | 73/146.5 |
| 5,231,872 | 8/1993 | Bowler et al. | 73/146.5 |
| 5,285,189 | 2/1994 | Nowicki et al. | 340/477 |
| 5,289,160 | 2/1994 | Fiorletta | 340/447 |
| 5,301,553 | 4/1994 | Schultz et al. | 73/705 |
| 5,335,540 | 8/1994 | Bowler et al. | 73/146.5 |
| 5,359,886 | 11/1994 | Pradelle | 73/146.2 |
| 5,460,037 | 10/1995 | Chamussy et al. | 73/146.3 |
| 5,463,374 | 10/1995 | Mendez et al. | 340/422 |
| 5,473,938 | 12/1995 | Handfield et al. | 340/445 |
| 5,483,826 | 1/1996 | Schultz et al. | 73/146.5 |
| 5,483,827 | 1/1996 | Kulka et al. | 73/146.5 |
| 5,500,637 | 3/1996 | Kokubu | 340/447 |
| 5,517,853 | 5/1996 | Chamussy | 73/146.3 |
| 5,540,092 | 7/1996 | Handfield et al. | 73/146.5 |
| 5,559,484 | 9/1996 | Nowicki et al. | 340/447 |
| 5,602,524 | 2/1997 | Mock et al. | 340/447 |

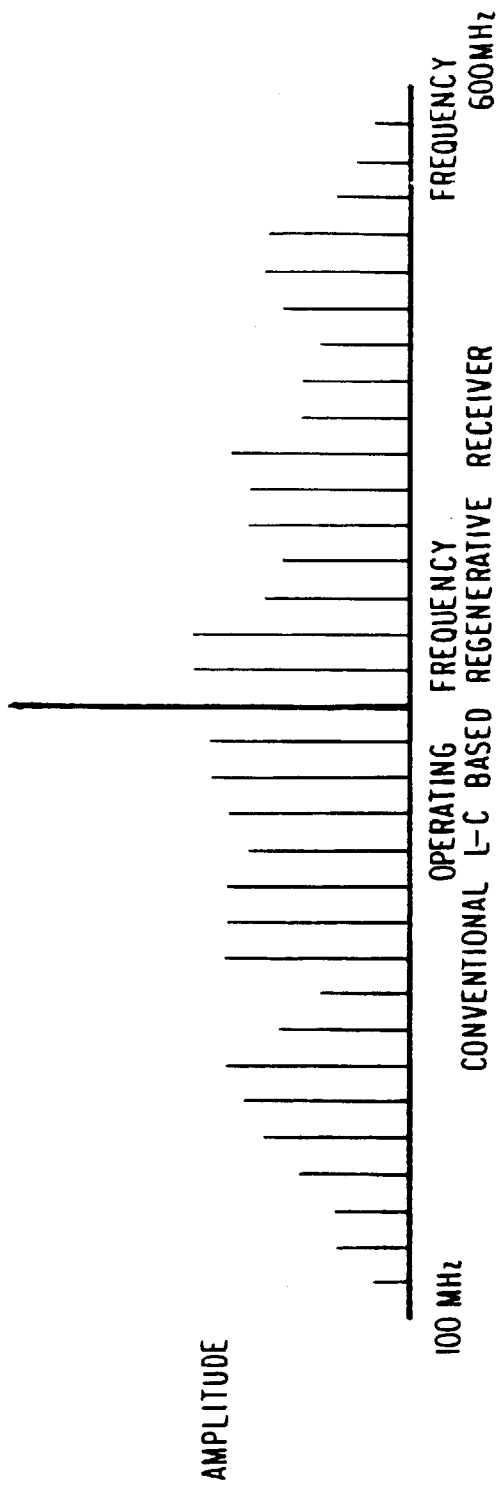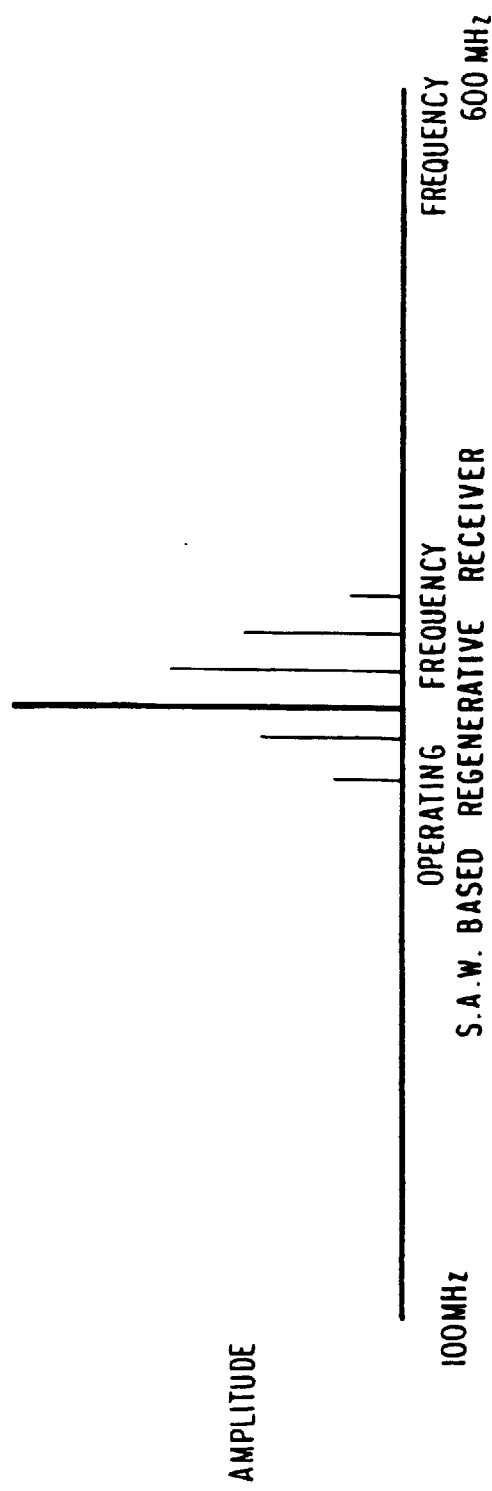
FIG. 6A PRIOR ART
FIG. 6B

REMOTE TIRE PRESSURE MONITORING SYSTEM EMPLOYING CODED TIRE IDENTIFICATION AND RADIO FREQUENCY TRANSMISSION AND ENABLING RECALIBRATION UPON TIRE ROTATION OR REPLACEMENT

This is a continuation of application Ser. No. 08/491,890, filed as PCT/US93/01995 Mar. 11, 1993, now U.S. Pat. No. 5,600,301.

BACKGROUND OF THE INVENTION

The present invention relates to a system for monitoring pressure of tires in a wheeled vehicle. In particular, the invention relates to a tire pressure monitoring system employing individual battery-powered pressure sensors in each wheel, for transmitting uniquely coded information to a receiver mounted on the vehicle for display to a vehicle operator.

The art is replete with various known approaches to providing indications of tire pressure. These approaches include tire pressure sensors which provide temperature-compensated tire pressure information. Compensation for changes in temperature is important. Because air expands with temperature, and because tires get hotter the longer a vehicle is operated, failure to provide compensation for temperature can yield inordinately high pressure readings. Likewise, particularly cold weather can yield low tire pressure readings. These high and low readings need to be normalized to a constant temperature.

For the most part, known approaches to temperature compensation have employed electronic alteration of tire pressure sensor outputs. Examples may be found in U.S. Pat. Nos. 4,567,459, 4,703,650, and 4,966,034.

The art further includes a number of known approaches for communicating tire pressure information to a vehicle operator inside the vehicle. These approaches include tuned circuits and radio transmitters. Examples of the former may be found in the just-mentioned U.S. patents. Examples of radio transmitter approaches may be found in U.S. Pat. Nos. 4,510,484, 4,554,527, and 5,061,917.

Another aspect of known tire pressure monitoring systems relates to the coding of digital values associated with respective tires on a vehicle. Examples of such approaches are found in U.S. Pat. No. 5,001,457 and in just-mentioned U.S. Pat. No. 5,061,917.

Integrated circuit technology and power generation technology have progressed to the point where long-life batteries can power small integrated circuits. An example of a system employing battery-powered transmitters on vehicle wheels is found in U.S. Pat. No. 4,978,941.

Known remote tire pressure monitoring systems are deficient in several respects. First, while presumably some of these systems are calibrated somehow during vehicle assembly to enable proper display on, for example, a dashboard console, these systems do not address the problem arising from the need to recalibrate the systems when the vehicles undergo standard maintenance such as tire rotation. The problem of replacement of damaged transmitters, and of calibration of the replacements, does not appear to be addressed, either.

Another deficiency relates to the coding of transmitters for associated receivers. As the cost of assembly of such systems decreases, the systems will proliferate. If there is overlapping of codes among different systems, false pressure readings from tires of one vehicle could be reported on the console of another vehicle in close proximity, having been received erroneously by a receiver on that other vehicle.

Also, while attention has been paid in the past to selection of appropriate transmission frequencies to avoid interference from other radio frequency sources, particular problems are presented by remote control systems, such as keyless entry systems, which are becoming more and more widely implemented.

Yet another problem which does not seem to have been addressed in known systems relates to battery drain in transmitters prior to installation, and avoidance of excessive battery drain in operation, in the absence of a low pressure reading.

It would be desirable to provide a tire pressure monitoring system which can learn, or relearn, tire locations simply on a vehicle when tires are rotated or replaced. It also would be desirable to provide a system which is not affected by similar systems on other vehicles, or by other radio frequency generating systems within the vehicle, such as keyless entry systems. Further, it would be desirable to provide a tire pressure monitoring system which takes advantage of newer longer-life power sources, and which uses temperature-compensated pressure sensor technology which is not power dependent in normal operation, so as to conserve power.

SUMMARY OF THE INVENTION

In view of the foregoing, it is an object of the invention to provide a remote tire pressure monitoring system which employs codes which are unique to the transmitters which are associated with a respective receiver.

It is another object of the invention to provide a remote tire pressure monitoring system which avoids interference from nearby radio signal generating sources, whether or not associated with the particular vehicle in question.

It is still another object of the invention to provide a remote tire pressure monitoring system which enables recalibration of the receiver after tire rotation.

It is yet another object of the invention to provide a remote tire pressure monitoring system which minimizes battery drain.

In accordance with the foregoing and other objects, the inventive system employs a unique binary code for each transmitter used in a vehicle. The code is transmitted by superimposing it on an amplitude modulated RF carrier signal using a surface acoustic wave (SAW)-based device, at a frequency which will not be affected by other radio frequency generating systems, either on the vehicle (e.g. a keyless entry system or car alarm activation system) or nearby (e.g. another remote tire pressure monitoring system on an adjacent vehicle). Buttons on a driver information console may be depressed after tire rotation to recalibrate the receiver on the vehicle to account for changed wheel (and hence changed transmitter) locations on the vehicle.

The inventive system employs a mechanical temperature compensated pressure sensor which does not consume power in normal operation. Switch contacts are opened when tire pressure falls below a predetermined value, causing a signal to be sent to the driver information console.

BRIEF DESCRIPTION OF THE DRAWINGS

The foregoing and other objects and features of the invention now will be described in detail by way of a preferred embodiment, depicted in the accompanying drawings, in which:

FIG. 6 is a comparative diagram showing performance of the surface acoustical wave (SAW)-based receiver of the invention as contrasted with that of conventional receivers;

DETAILED DESCRIPTION OF A PREFERRED EMBODIMENT

Figure 1:
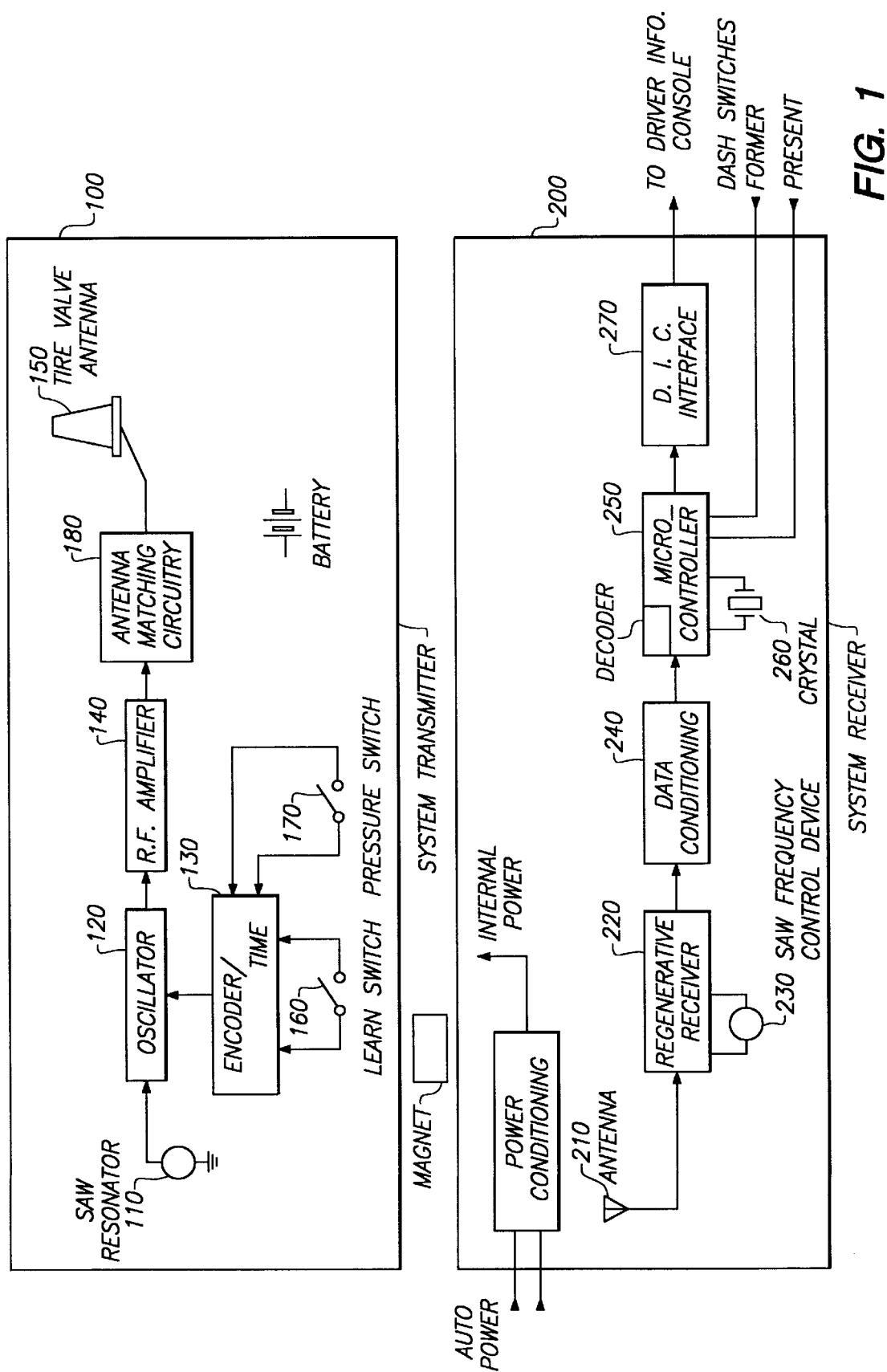
FIG. 1 is a block diagram of receiving and transmitting apparatus according to a preferred embodiment of the invention.
Figure 2:
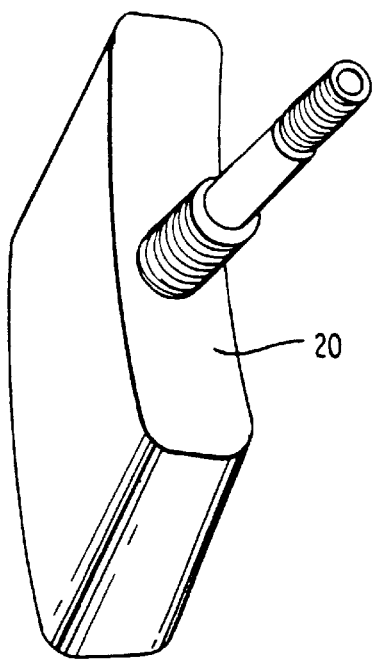
FIG. 2 is a drawing of the physical configuration of the transmitting apparatus.

FIG. 1 is a block diagram of the inventive remote tire pressure monitoring system, in which a system sensor/transmitter 100, one of these being provided for each tire in a vehicle, is shown in conjunction with a system receiver 200. Each sensor/transmitter is mounted to the back of a conventional screw-in tire valve to provide an overall assembly 20, as shown in FIG. 2. As will be described, the valve acts as an antenna to transmit coded tire identification and pressure information to the receiver 200.

Figure 3:
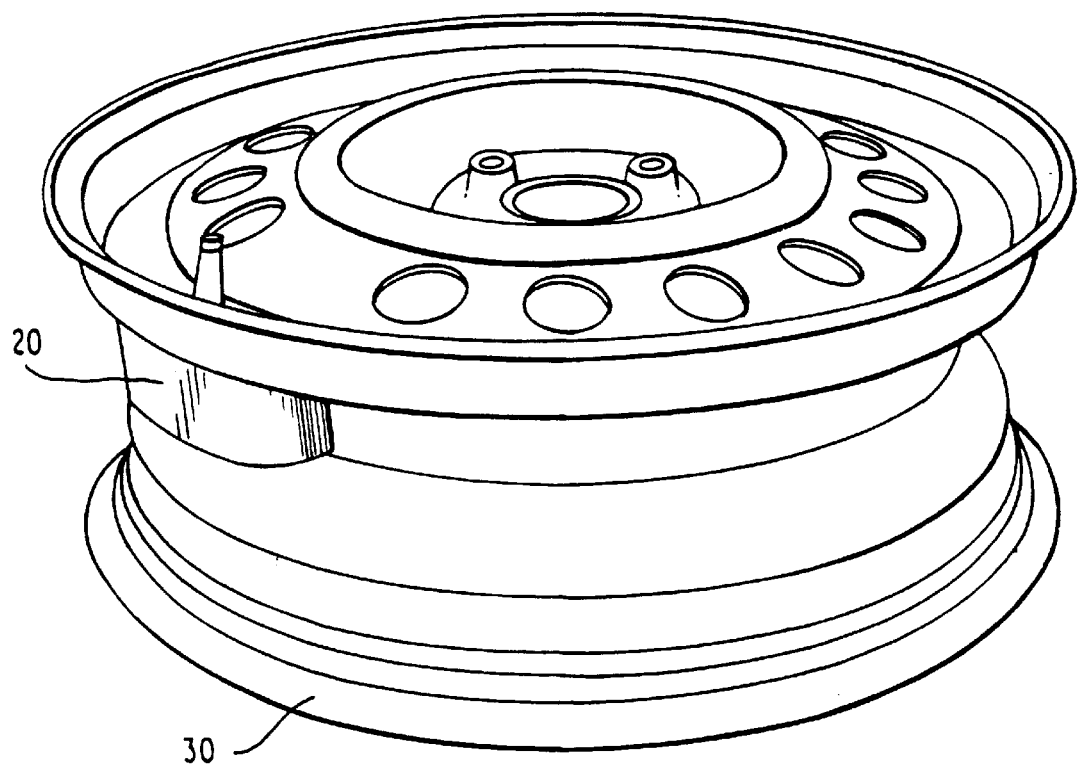
FIG. 3 is a drawing of the physical placement of the transmitting apparatus in a drop-center of a vehicle wheel.

Before proceeding to a detailed description of the electronics, some description of the mechanical aspects of the device will be provided. The sensor/transmitter electronics are packaged in a glass-filled nylon housing, and are potted to provide additional protection from mechanical vibration, dirt, and the like. The described mounting makes the in-tire unit easy to install and inexpensive to manufacture. The overall weight of the device is kept to a minimum, so as to reduce or eliminate the need to provide counterbalancing in the wheel in which the device is mounted. Also, by keeping the size of the device as small as possible, the device can be mounted and protected easily within the wheel's drop-center cavity, for protection from tire removal equipment. FIG. 3 shows one example of such drop center mounting of the assembly 20 on a wheel 30.

Each sensor/transmitter uses an internal lithium power source, which can provide continuous power for up to ten years. The power source's long life makes it feasible to provide permanent mounting; the power source is not replaced when it is exhausted.

The electronics have been designed to conserve space by using surface-mounted parts. The printed-circuit board (PCB) for the electronics is made from a flame resistance fiberglass FR-4 material in the preferred embodiment; other materials may be used if desired. The off-board components are connected to the main PCB using strain relief through-hole connections.

Figure 4:
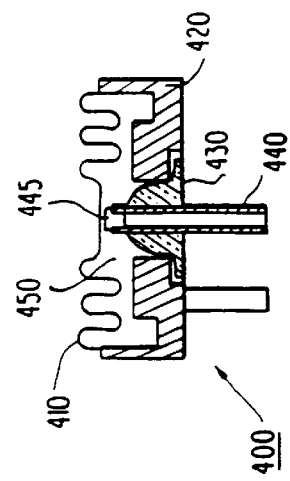
FIG. 4 is a drawing of a pressure switch employed in the preferred embodiment.

The sensor 400 itself, shown schematically in FIG. 4, is a mechanical device which provides a low pressure report through the opening of a switch. As will be appreciated from the following, the sensor does not consume any power. This is an important feature for the long operating life of the device. In FIG. 4, the sensor 400 has a pressure diaphragm 410 made of a beryllium-copper alloy. The body 420 is made of brass. A glass to metal seal 430 surrounds a post 440, and seals a chamber 450 which is formed by the diaphragm 410 and the body 420. The chamber 450 is filled with dry nitrogen, which has the same temperature expansion characteristics as air, to a pressure just below that necessary to cause a low tire pressure report. For example, this may be 25 psi at 20° C. for the tires on the car, and 60 PSI for trunk mounted spares. The pressure may be different for truck or other types of tires. Thus, the far side of the diaphragm 410 is exposed to nitrogen, and the near side is exposed to air within the tire.

The post 440 has a gold contact 445, which normally is in contact with the diaphragm 410. When air pressure within the tire decreases below a predetermined amount, the nitrogen within the chamber 450 forces the diaphragm away from the contacts 445, thus opening the switch. Since this switch is an inactive element, it does not consume any power, as mentioned above.

The system will output an alarm when the pressure in any tire mounted on the vehicle drops below a predetermined point. Further, the system is self-monitoring, and will report any system malfunction to the user. Still further, the data output of the receiver can be made to be compatible with a driver information console computer in a vehicle, so that tire pressure information can be displayed directly on a dashboard readout, along with other operational information. In addition, as described herein, the controls of the driver information console computer can be utilized to recalibrate the system in the event of tire rotation.

Looking again at FIG. 1, a surface acoustic wave (SAW) device 110 functions as the primary oscillator in each sensor/transmitter 100, to provide an amplitude-modulated RF carrier signal. An application specific integrated circuit (ASIC) 130 is configred to set the output data rate of the coding circuitry of the device (described below).

The SAW device 110 was selected because it is an inherently stable frequency source, and is frequency compensated over a wide temperature range. This compensation feature is particularly important, given that the device needs to provide an accurate radio transmission frequency whether the tire is very cold or very hot. The SAW device 110 provides a low output RF signal which is selected to provide a minimum of possible interference with respect to other sources. Selection also is based on the necessity of providing a reliable communications path through small openings characteristic of automobiles. Consequently, in the preferred embodiment, a frequency of approximately 418.0 MHz was chosen.

Figure 5:
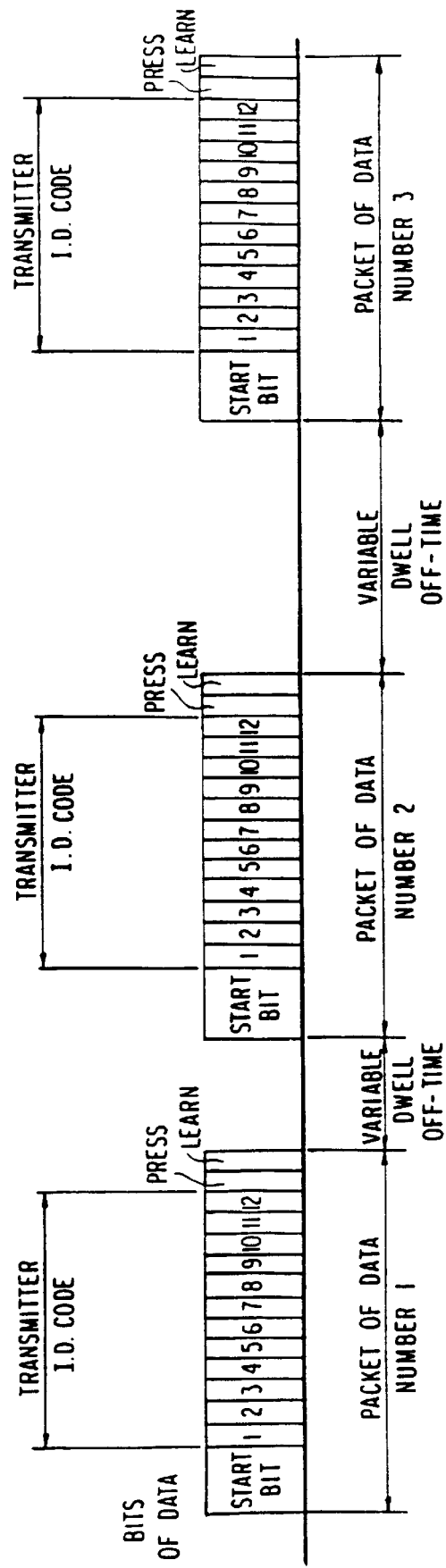
FIG. 5 is a time chart showing timing of transmission of individual data packets from the transmitting apparatus to the receiving apparatus.

The ASIC 130 creates data to be transmitted, in the form of a serial data signal, in response to opening of the pressure switch of FIG. 4. As seen in FIG. 5, the serial data signal contains a multiple-bit transmitter identification (ID) code, a one-bit pressure code, and a one-bit learn code. The number of bits in the transmitter ID code will depend on the number of unique codes necessary to identify the transmitters properly. In one embodiment, the ID code is 12 bits long. However, the ID code may be 20 bits long, or 24 bits long, or longer if necessary. A start bit precedes each transmitter ID code. The ASIC 130 produces TTL level signals necessary to drive the oscillator 120. Inputs to the ASIC 130 include a magnetically-activated learn-mode switch 160, the pressure switch 170 described above, and multiple PC board trace switches necessary to set the individual transmitter code, which is programmed into each transmitter during manufacture. The transmitter itself is designed in accordance with FCC requirements.

Figure 8:
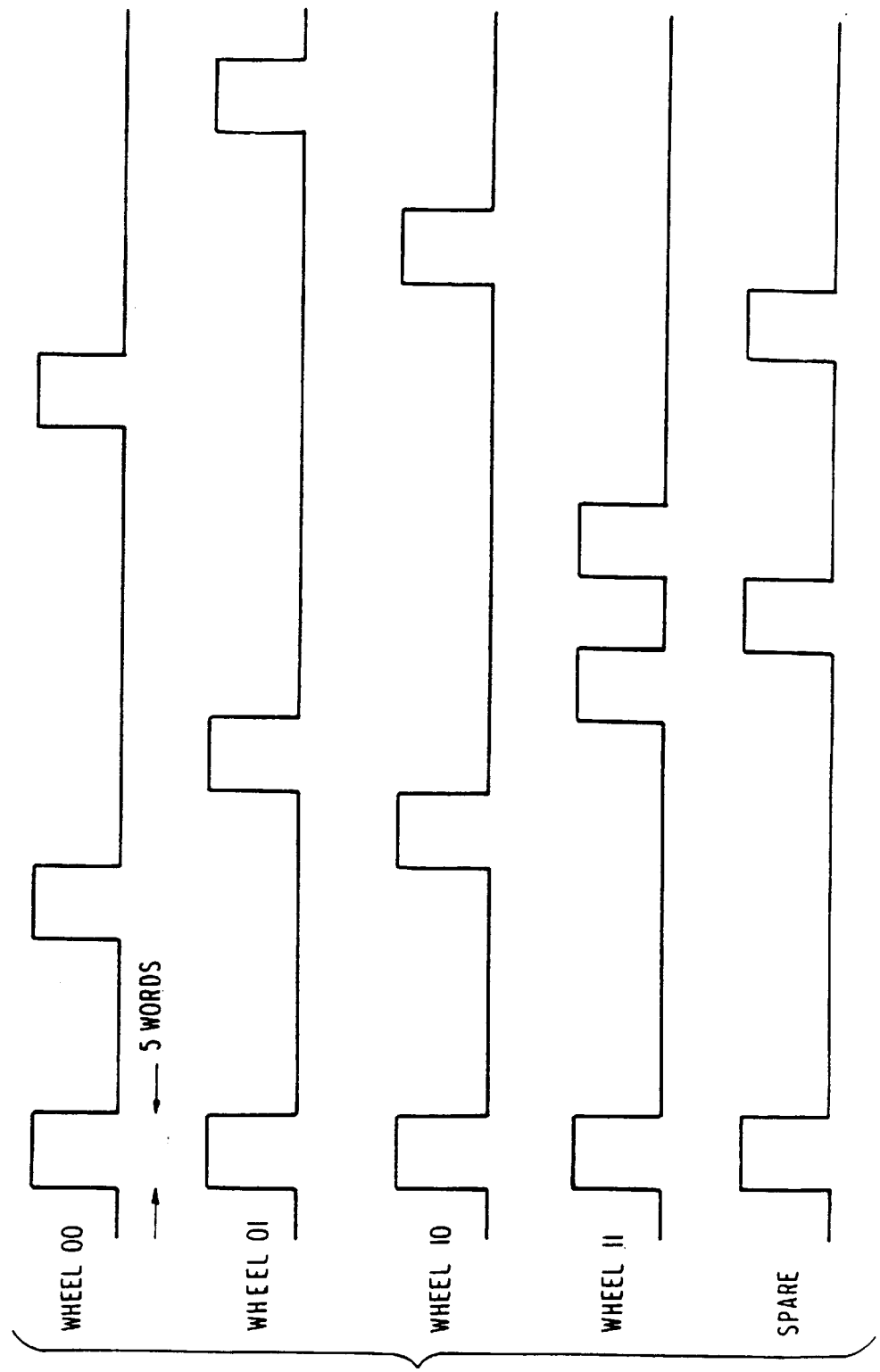
FIG. 8 is a timing diagram showing how tire pressure information for each wheel can be transmitted to the receiving apparatus without conflict.

Another aspect of the code which is programmed into the ASIC 130 relates to the timing of transmission. As shown in the timing diagram of FIG. 8, a random dwell time period, or off period, between consecutive data packets, is provided. This off period is indexed to the specific transmitter code programmed into each transmitter 100 at the time of manufacture. As a result, no two transmitters will transmit at exactly the same time, thus reducing or eliminating the possibility of transmitter interference or RF clash. This feature is particularly important when the inventive system is implemented in an entire vehicle fleet, for example. The likelihood thus is reduced that transmitters in one vehicle in the fleet will provide a false low pressure report to another vehicle.

The uniqueness of the twelve-bit code also contributes to the ability of each system receiver to distinguish signals sent from its own transmitters from those of transmitters mounted on other vehicles.

The RF signal output, with the ASIC-supplied code superimposed thereon, is amplified and buffered in a following amplifier stage 140 which may be a simple, efficient, low-cost common emitter amplifier which can produce an RF signal having an amplitude appropriate for supplying effective communication to a receiver operating within the vehicle's passenger compartment. The data signal from the transmitter's encoder ASIC keys this amplifier stage on and off. The result is a pulse width modulated signal which conveys digital information, superimposed on the amplitude-modulated RF carrier.

The output of amplifier 140 is matched correctly onto a valve stem 150 of the tire. The valve stem 150 is a particularly appropriate antenna, because it is exposed through the vehicle wheel, and hence makes an ideal radio signal radiator. The antenna matching circuitry 180 provides for maximum RF power transfer. It can be appreciated that using an antenna which is contained completely within the tire would reduce the amount of energy at the receiver, thus necessitating either a more powerful transmitter, or a more sensitive receiver. In view of the transmitter's operating frequency, the valve stem is short. Hence, appropriate impedance matching circuitry 180 is provided to ensure that all of the radio frequency is conducted to the antenna. Also, to isolate the valve stem from water dirt, and also to insulate it from the conductive wheel in which it is mounted, a special non-conductive coating is applied to the exterior of the valve.

Looking now at receiver 200 in FIG. 1, it is noted first that the function of this receiver is to accept information from each wheel in the device (i.e. from each of the transmitters 100), decode that information, and send it to the driver's information console for display to the vehicle operator. Each receiver 200 is a very low power, regenerative type receiver which operates at the frequency of its assoiated transmitters 100. The receiver 200 is designed to be compatible with other radio frequency receivers operating within the same vehicle. Such receivers include, for example, that associated with a keyless entry system with which the vehicle may be equipped.

The receiver 200 incorporates a regenerative design because such a design is low in cost, is efficient, and exhibits a high sensitivity. As in the transmitter 100, the receiver 200 uses SAW-based frequency control, thus stabilizing the operating frequency effectively in view of both temperature and mechanical vibration. The SAW-based design also is advantageous because it enables tight containment of the characteristic spectral noise, inherently created by a regenerative receiver, around the desired operating frequency. This result is shown graphically in FIG. 6.

The tight containment around the operating frequency enhances the compatibility of the receiver with other receivers within the vehicle. This SAW-based receiver design approach also exhibits good selectivity.

As shown in FIG. 1, an antenna 210 receives signals from the valve stem antenna 150. The antenna 210, which is mounted within an enclosure of the receiver 200, is sensitive in both vertical and horizontal polarization modes in order to decrease the effects of polarization mismatch between system transmitters and receivers.

The received signal is provided to regenerative receiver 220, which as described above operates in conjunction with a SAW frequency control device 230. A data conditioning section 240 is provided at the output of receiver 220, to reduce signal degradation which can be caused by external noise. The output of data conditioning section 240 is provided to a microcontroller 250, which in the preferred embodiment is an eight-bit microcontroller, though the use of other more powerful microcontrollers is contemplated as processors become more powerful and less expensive.

The microcontroller 250, which receives timing signals from crystal 260, decodes the information in the signal and transmits it to a bus interface 270 which interprets the decoded information in accordance with the particular driver information console in the vehicle. Different vehicle manufacturers may use different proprietary designs for their consoles, so the bus interface likewise would be proprietary to the manufacturer. As the interface is a separately-available component, it need not be described in detail here. Normally, however, the interface will be comprised of an integrated circuit and perhaps four or five external passive, low-cost components.

Figure 7:
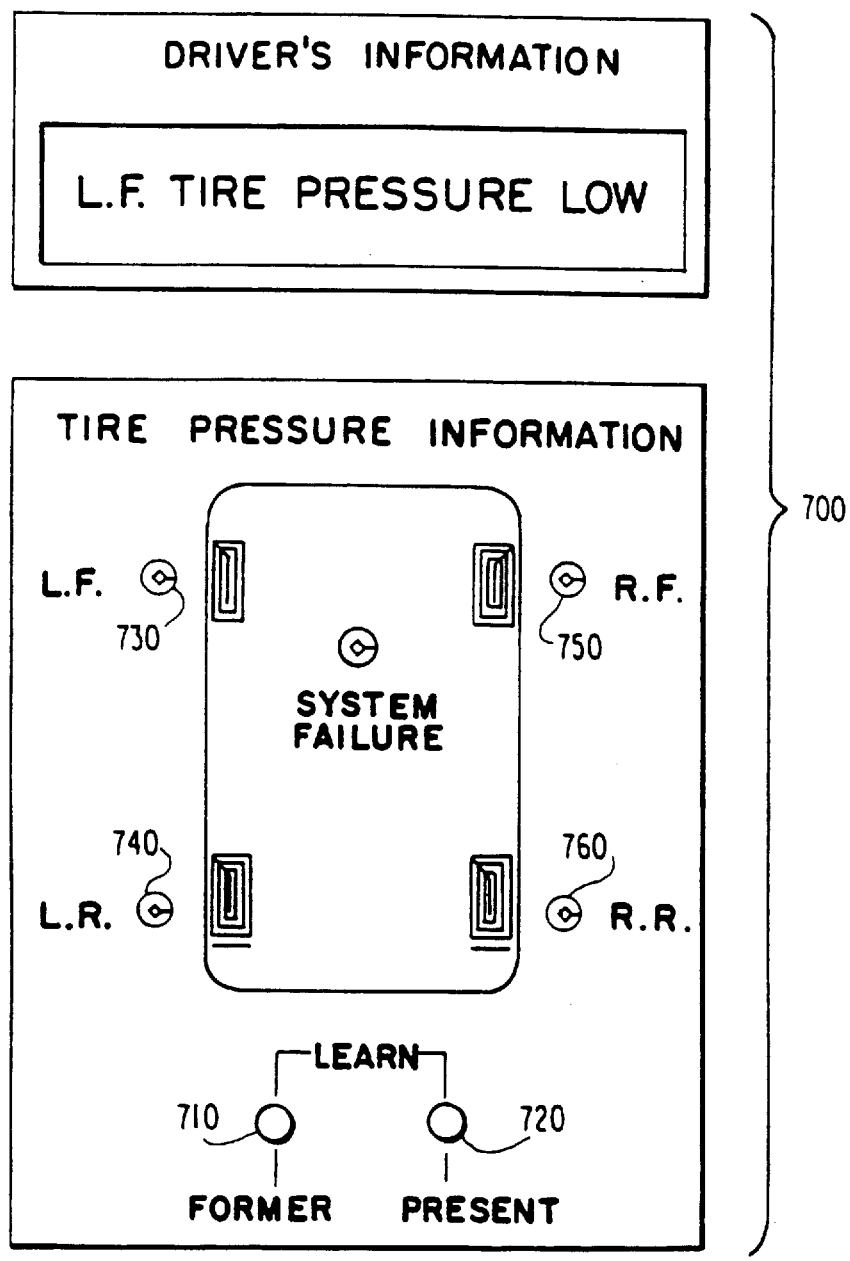
FIG. 7 is an exemplary layout of a driver information console (DIC) display.

As supplied by the automobile manufacturer, the driver information console 700 itself, an example of which is shown in FIG. 7, may be comprised of a plurality of lamps, light emitting diodes (LEDs), or alternatively may be a liquid crystal display.

The receiver 200 also includes a wheel-rotation recalibration switch interface, assoiated with microcontroller 250. As has been mentioned, recalibration of the system is necessary in order to "teach" the system any new wheel locations resulting from rotation of the tires. In fact, the same structure may be used at manufacture to "teach" the system the initial wheel location (e.g. left front and rear, right front and rear, for a four-wheeled vehicle) at the time of manufacture.

Also shown at the upper left hand comer of receiver 200 in FIG. 1 is power conditioning circuitry 280, which includes a voltage regulator for reducing and adjusting the standard voltage (e.g. 13.8 volts) provided by a vehicle electrical system to a stable 5.0 volts used by the circuitry in the radio frequency, microcontroller, and driver information console interface circuitry.

In accordance with another feature of the invention, each receiver system is able to "learn" the codes associated with its restive transmitters. This feature contributes further to the anti-clash capabilities described earlier. Each receiver is "taught" the necesary codes at the time of manufacture. Referring to FIG. 7, driver information console 700 has two subminiature buttons 710 and 720, located near tire pressure warning display lamps 730–760. In the preferred embodiment, the two buttons are depressed simultaneously for three seconds, to place the system in "learn" mode for approximately 60 seconds. During this time, the receiver will be sensitive to receipt of a distinctive learn mode signal from one of its tire-mounted transmitters. In order to send the learn mode signal, a strong magnet is swept over the outside of each of the vehicle tires near each respective transmitter. As each transmitter receives the resulting magnetic signal, it transmits its learn signal back to the system receiver, which has been synthesized to learn its new family of transmitter codes.

The sequence in which the transmitters teach the receiver (i.e. the order in which the magnet is passed by each of the vehicle wheels) determines the current location of each tire on the vehicle, e.g. left front, left rear, right front, right rear, etc. This process enables easy start-up position calibration when the system is installed at the factory where the vehicle is assembled.

Another function of passage of the magnet across the transmitters is to "wake up" the transmitters from a sleep mode into which they are placed at the time of manufacture, in order to reduce significant battery drain prior to installation, and thus extend transmitter shelf life.

The receiver also may be made sensitive to additional transmitter codes, such as a common replacement code, in order to effect replacement of a transmitter in the event of damage.

The "learn" feature is important not only at the time of manufacture, but also during routine maintenance of the vehicle, for example, when the tires are rotated. Since the receiver 200 is programmed to associate the codes of its transmitters with the locations of those transmitters on the vehicle (e.g. left front, left rear, right front, right rear), when the tires are rotated, the locations must be relearned; otherwise, in the event of excessive decrase of tire pressure in a particular tire, the display on the driver information console would provide incorrect information.

As shown in FIG. 7, the two sub-miniature buttons 710 and 720 are labeled "former" and "present", respectively. Immediately after tire rotation, a service technician presses the "former" button 710 repeatedly until the desired tire location is illuminated on the driver information console 700. After the former position has been indexed in this manner, the technician presses the "present" button 720 until the present position of the tire is illuminated on console 700. After the "present" button is released, the former and present positions of any one tire will flash sequentially, followed by a pause (which may be, for example, one half-second long) to indicate the recalibration to be stored. This information could also be displayed on an LCD display. This new tire location will be recalibrates into the system receiver when both the former and the present buttons are pressed together for a brief period, less than three seconds. This procedure is repeated for each of the tires in the system, and concludes when the last tire has been recalibrated by depressing both former and present buttons together for ten seconds, for example.

As an example, in a standard tire rotation, the front tires are shifted to the back, and the back tires will be shifted to the front. A first recalibration step would be to press the "former" button 710 until the left front light on the driver information console 700 is illuminated. Then, "present" button 720 would be pressed until the left rear light on the console 700 is illuminated. When both former and present buttons are depressed, the location of the transmitter, shifted from left front to left rear, will be stored in receiver 200.

While the invention has been described in detail with reference to a preferred embodiment, various changes and modifications within the scope and spirit of the invention will be apparent to those of worling skill in this technological field. Thus, the invention is to be considered as limited only by the scope of the appended claims.

I claim:

1. In a vehicle having a plurality of wheels, each of said wheels having at least one tire mounted thereon, a tire pressure monitoring system including a display interface inside said vehicle for providing an indication of abnormal tire pressure, said system further comprising, for each of said tires, sensing transmitting means which comprise;

means for sensing pressure;

means for producing signals indicative of temperature-compensated pressure of a respective one of said tires;

means for encoding said signals so as to provide encoded signals, identifying said each of said tires, and location thereof on said vehicle uniquely; and means for transmitting said encoded signals;

said system further comprising:

means for receiving said encoded signals;

means for decoding said encoded signals, and providing display signals accordingly; and means for providing a display indicative of low pressure and location of said each of said tires in accordance with said display signals;

characterized in that the sensing/transmitting means are mounted internally of the tire, and in that the system comprises means for recalibrating said system such that, in the event of rotation of tires on said vehicle, said system reacquires information on said location of each of said tires, said means for recalibrating said system comprising a magnetically-activated switch, responsive to a magnetic field in a vicinity thereof, wherein activation of said switch causes transmission of a location of a respective one of said tires on said vehicle.

2. A system as claimed in claim 1, wherein said means for recalibrating said system further comprises a microcontroller and pushbuttons associated with said means for providing a display, wherein depression of said pushbuttons in a predetermined manner programs said microcontroller to store location of said tires on said vehicle.

3. A system as claimed in claim 2, wherein activation of said switch in conjunction with said depression of said push buttons in said predetermined manner programs said microcontroller to store location of said tires on said vehicle.

4. A system as claimed in claim 2, wherein said means for providing a display comprises a driver information console and said pushbuttons, said driver information console also providing additional information concerning operation of said vehicle.

5. A system as claimed in claim 1, wherein said means for encoding comprises an application specific integrated circuit (ASIC), and said encoded signals comprise a multiple-bit identification code.

6. A system as claimed in claim 5, wherein said multiple-bit identification code is a 12-bit code.

7. A system as claimed in claim 5, wherein said multiple-bit identification code is a 20-bit code.

8. A system as claimed in claim 5, wherein said multiple-bit identification code is a 24-bit code.

9. A system as claimed in claim 1, wherein said means for encoding comprises an application specific integrated circuit (ASIC), and said encoded signals comprise a one-bit pressure code indicating a state of tire pressure.

10. A system as claimed in claim 1, wherein said means for encoding comprises an application specific integrated circuit (ASIC), and said encoded signals comprise a one-bit learn code indicative of whether said sensing/transmitting means is providing information to teach said means for recalibrating so as to enable said system to reacquire information on said location of each of said tires.

11. A system as claimed in claim 1 wherein said means for encoding comprises an application specific integrated circuit (ASIC), said ASIC in turn comprising means for providing a dwell time between outputted encoded signals, said encoded signals comprising a multiple-bit identification code, and said dwell time being predetermined in accordance with said multiple-bit identification code.

12. A system as claimed in claim 11, wherein said multiple-bit identification code is a 12-bit code.

13. A system as claimed in claim 11, wherein said multiple-bit identification code is a 20-bit code.

14. A system as claimed in claim 11, wherein said multiple-bit identification code is a 24-bit code.

15. A system as claimed in claim 1, wherein said means for sensing pressure comprises:
a transducer having a housing with an open end closed off by a diaphragm to define a chamber, the chamber being filled with dry nitrogen, a side of the diaphragm not facing said dry nitrogen being exposed to an interior of said tire; and
a normally closed switch comprising first and second contacts, said second contacts being associated with said diaphragm, wherein said diaphragm moves away from said first contacts to open said normally closed switch when a pressure of one of said tires falls below a predetermined value.

16. A system as claimed in claim 1, wherein said means for producing signals comprises a surface acoustic wave (SAW) device.

17. A system as claimed in claim 16, wherein said means for receiving said encoded signals comprises a regenerative receiver and a SAW frequency control device.

18. A system as claimed in claim 1, wherein said means for decoding said encoded signals comprises a microcontroller.

19. A system as claimed in claim 1, further comprising a plurality of battery means for powering a respective one of said sensing/transmitting means.

20. A tire pressure sending unit comprising:
a pressure sensor;
a signal processor, responsive to the pressure sensor, and operative to produce a tire pressure signal indicative of a tire pressure;
a transmitter, responsive to the signal processor and operative to generate a radio signal indicative of said tire pressure; and
a magnetically-activated switch, responsive to a magnetic field in a vicinity thereof, and coupled to said transmitter to activate said transmitter;
wherein said pressure sensor, said signal processor, said transmitter, and said magnetically activated switch are mounted internally of a tire; and
wherein, for a plurality of tire pressure sending units, sequential activation of said magnetically-activated switch on each respective one of said tire pressure sending units in a predetermined order in response to said magnetic field causes said transmitter to transmit a code which will indicate a location of said tire on a vehicle.

21. A tire pressure sending unit as claimed in claim 20, wherein said pressure sensor produces an indication of temperature-compensated pressure of said tire, and said tire pressure signal indicates temperature-compensated pressure of said tire.

22. A tire pressure sending unit as claimed in claim 21, wherein said signal processor comprises an encoder for encoding said tire pressure signals so as to provide encoded tire pressure signals, and a location of said tire on a vehicle.

23. A tire pressure sending unit as claimed in claim 22, for each of a plurality of tires on a vehicle, and further comprising recalibration apparatus which, in the event of rotation of tires on the vehicle, enables reacquisition of information on tire location.

24. A tire pressure sending unit as claimed in claim 23, further comprising a receiver which receives the encoded signals;
a decoder which decodes the encoded signals, and provides display signals accordingly; and
a display indicative of low pressure and location of said each of the tires in accordance with said display signals; and
wherein the recalibration apparatus further comprises a microcontroller and pushbuttons associated with the display, wherein depression of the pushbuttons in a predetermined manner programs the microcontroller to store tire location.

25. A tire pressure sending unit as claimed in claim 24, wherein depression of the pushbuttons in said predetermined manner, in conjunction with activation of the magnetically-activated switch, programs the microcontroller to store tire location.

26. A tire pressure sending unit as claimed in claim 25, wherein the encoder comprises an application specific integrated circuit (ASIC), and said encoded signals comprise a one-bit learn code indicative of whether the pressure sensor and transmitter are providing information to teach the recalibration apparatus so as to enable the reacquisition of information on tire location.

27. A tire pressure sending unit as claimed in claim 25, wherein the encoder comprises an application specific integrated circuit (ASIC), the ASIC in turn comprising means for providing a dwell time between outputted encoded signals, the encoded signals comprising a multiple-bit identification code, and the dwell time being predetermined in accordance with the multiple-bit identification code.

28. A tire pressure sending unit as claimed in claim 24, wherein said display comprises a driver information console and the pushbuttons, the driver information console also providing additional information concerning operation of the vehicle.

29. A tire pressure sending unit as claimed in claim 24, wherein the encoder comprises an application specific integrated circuit (ASIC), and said encoded signals comprise a multiple-bit identification code.

30. A tire pressure sending unit as claimed in claim 29, wherein said multiple-bit identification code is a 12-bit code.

31. A tire pressure sending unit as claimed in claim 29, wherein said multiple-bit identification code is a 20-bit code.

32. A tire pressure sending unit as claimed in claim 29, wherein said multiple-bit identification code is a 24-bit code.

33. A tire pressure sending unit as claimed in claim 24, wherein the receiver comprises a regenerative receiver and a surface acoustic wave (SAW) device.

34. A tire pressure sending unit as claimed in claim 24, wherein the decoder comprises a microcontroller.

35. A tire pressure sending unit as claimed in claim 22, wherein the encoder comprises an application specific integrated circuit (ASIC), and said encoded signals comprise a one-bit pressure code indicating a state of tire pressure.

36. A tire pressure sending unit as claimed in claim 20, wherein the pressure sensor comprises:

a transducer having a housing with an open end closed off by a diaphragm to define a chamber, the chamber being filled with dry nitrogen, a side of the diaphragm not facing the dry nitrogen being exposed to an interior of the tire; and a normally closed switch comprising first and second contacts, the second contact being associated with the diaphragm, wherein the diaphragm moves away from the first contact to open the normally closed switch when tire pressure falls below a predetermined value.

37. A tire pressure sending unit as claimed in claim 20, wherein the signal processor comprises a surface acoustic wave (SAW) device.

38. A tire pressure sending unit as claimed in claim 20, further comprising a battery for powering the unit.

39. In a vehicle having a plurality of wheels, each of said wheels having at least one tire mounted thereon a tire pressure monitoring system including a display interface inside said vehicle for providing am indication of abnormal tire pressure, said system further comprising, for each of said tires, sensing/transmitting means which comprise:

means for sensing pressure;

means for producing signals indicative of temperature-compensated pressure of a respective one of said tires;

means for encoding said signals so as to provide encoded signals, identifying said each of said tires, and location thereof on said vehicle uniquely;

means for transmitting said encoded signals; and means for recalibrating said system such that, in the event of rotation of tires on said vehicle, said system reacquires information on said location of each of said tires, said means for recalibrating said system comprising a magnetically-activated switch, responsive to a magnetic field in a vicinity thereof, wherein activation of said switch causes transmission of a location of a respective one of said tires on said vehicle;

wherein the sensing/transmitting means are mounted internally of the tire.

40. A system as claimed in claim 39, wherein said system further comprises:

means for receiving said encoded signals;

means for decoding said encoded signals, and providing display signals accordingly; and means for providing a display indicative of low pressure and location of said each of said tires in accordance with said display signals; and wherein said means for recalibrating further comprises a microcontroller and pushbuttons associated with said means for providing a display, wherein depression of said pushbuttons in a predetermined manner programs said microcontroller to store location of said tires on said vehicle.

41. A system as claimed in claim 40, wherein depression of said pushbuttons in said predetermined manner, in conjunction with said activation of said magnetically-activated switch, programs said microcontroller to store said location of a respective one of said tires on said vehicle.

42. A system as claimed in claim 41, wherein said means for providing a display comprises a driver information console and the pushbuttons, the driver information console also providing additional information concerning operation of the vehicle.

43. A system as claimed in claim 42, wherein the means for encoding comprises an application specific integrated circuit (ASIC), and said encoded signals comprise a multiple-bit identification code.

44. A system as claimed in claim 43, wherein said multiple-bit identification code is a 12-bit code.

45. A system as claimed in claim 43, wherein said multiple-bit identification code is a 20-bit code.

46. A system as claimed in claim 43, wherein said multiple-bit identification code is a 24-bit code.

47. A system as claimed in claim 41, wherein said means for encoding comprises an application specific integrated circuit (ASIC), and said encoded signals comprise a one-bit pressure code indicating a state of tire pressure.

48. A system as claimed in claim 41, wherein said means for encoding comprises an application specific integrated circuit (ASIC), and said encoded signals comprise a one-bit learn code indicative of whether the sensor and transmitter are providing information to teach the recalibration apparatus so as to enable the reacquisition of information on tire location.

49. A system as claimed in claim 41, wherein the means for encoding comprises an application specific integrated circuit (ASIC), the ASIC in turn comprising means for providing a dwell time between outputted encoded signals, the encoded signals comprising a multiple-bit identification code, and the dwell time being predetermined in accordance with the multiple-bit identification code.

50. A system as claimed in claim 40, wherein the means for receiving said encoded signals comprises a regenerative receiver and a surface acoustic wave (SAW) device.

51. A system as claimed in claim 40, wherein the means for decoding said encoded signals comprises a microcontroller.

52. A system as claimed in claim 39, wherein the means for sensing pressure comprises:

a transducer having a housing with an open end closed off by a diaphragm to define a chamber, the chamber being filled with dry nitrogen, a side of the diaphragm not facing the dry nitrogen being exposed to an interior of the tire; and a normally closed switch comprising first and second contacts, the second contact being associated with the diaphragm, wherein the diaphragm moves away from the first contact to open the normally closed switch when tire pressure falls below a predetermined value.

53. A system as claimed in claim 39, wherein the means for encoding comprises a surface acoustic wave (SAW) device.

* * * * *